United States Patent
Zhao et al.

(10) Patent No.: US 12,032,499 B2
(45) Date of Patent: Jul. 9, 2024

(54) HYBRID PCB TOPOLOGY AND LAYOUT WITH CLAMSHELL PLACEMENT FOR STORAGE APPLICATIONS

(71) Applicant: InnoGrit Technologies Co., Ltd., Shanghai (CN)

(72) Inventors: Gang Zhao, Chandler, AZ (US); Lin Chen, Cupertino, CA (US)

(73) Assignee: InnoGrit Technologies Co., Ltd., Shanghai (CN)

( * ) Notice: Subject to any disclaimer, the term of this patent is extended or adjusted under 35 U.S.C. 154(b) by 109 days.

(21) Appl. No.: 17/861,325

(22) Filed: Jul. 11, 2022

(65) Prior Publication Data

US 2024/0012768 A1   Jan. 11, 2024

(51) Int. Cl.
*G06F 13/36* (2006.01)
*G06F 12/02* (2006.01)
*G06F 13/16* (2006.01)

(52) U.S. Cl.
CPC ...... *G06F 13/1668* (2013.01); *G06F 12/0238* (2013.01); *G06F 2212/202* (2013.01)

(58) Field of Classification Search
CPC ............. G06F 13/1668; G06F 12/0238; G06F 2212/202
See application file for complete search history.

(56) References Cited

U.S. PATENT DOCUMENTS

| | | | | |
|---|---|---|---|---|
| 9,773,543 | B1* | 9/2017 | Tavares | G11C 11/408 |
| 2011/0320690 | A1* | 12/2011 | Petersen | G06F 3/0611 |
| | | | | 711/E12.019 |
| 2018/0074708 | A1* | 3/2018 | Gerhart | G06F 3/0604 |
| 2018/0210517 | A1* | 7/2018 | Yun | G06F 3/0679 |
| 2021/0204376 | A1* | 7/2021 | Muehlschlegel | H05B 45/37 |
| 2022/0046789 | A1* | 2/2022 | Park | H05K 1/117 |
| 2023/0073931 | A1* | 3/2023 | Watkins | G06N 3/063 |

\* cited by examiner

*Primary Examiner* — Henry Tsai
*Assistant Examiner* — Kim T Huynh
(74) *Attorney, Agent, or Firm* — IPro, PLLC

(57) ABSTRACT

A hybrid printed circuit board (PCB) topology is provided. A non-volatile storage system may include a PCB, a first non-volatile storage device attached to a first side of the PCB, a second non-volatile storage device attached to a second side of the PCB, and a storage controller coupled to the first and second non-volatile storage devices by a shared channel. The two devices may be placed in a clamshell configuration but have different capacities. The shared channel may have a first signal route to a first pin of the first non-volatile storage device and a second signal route to a second pin of the second non-volatile storage device. The first pin may have a pin capacitance that is smaller than that of the second pin. The first signal route has an extra resistor in series compared to the second signal route.

20 Claims, 7 Drawing Sheets

HYBRID PCB TOPOLOGY AND LAYOUT WITH CLAMSHELL PLACEMENT FOR STORAGE APPLICATIONS

TECHNICAL FIELD

This disclosure herein relates to the placement of non-volatile storage devices on a printed circuit board of a non-volatile storage system, and particularly relates to the multi-drop multi-load non-volatile storage interface topology where a number of non-volatile storage devices share a common data bus coupled to a non-volatile storage controller.

BACKGROUND

The evolution of the modern computing system is driven in-part by the emergence of the Solid State Drives (SSDs) that have demonstrated higher performance of speed and latency over the traditional hard drives. Unlike hard drives that depend on the magnetism to store data, solid state drives use NAND flash devices to achieve data storage. The NAND flash devices are a family of integrated circuits that are manufactured by advanced process and assembly technologies to achieve multiple levels of vertical stacking of storages units into a small footprint of package for high capacity of storage.

A typical SSD consists of a controller and a number of NAND flash devices which are placed on and connected through a printer circuit board (PCB) with a standard form factor for various consumer or enterprise usage models. The interface between the controller and NAND flash devices is grouped into channels, and a modern controller usually has 4, 8 or 16 NAND channels. In order to achieve higher storage capacity, the SSD needs to integrate more NAND flash devices into the PCB, thereby resulting in multiple NAND devices sharing a single channel. As a result, a multi-load or multi-drop PCB topology is often in place for the design of high-density SSD.

SUMMARY

Clamshell topology has been used in high-capacity SSD multi-load PCB, such as but not limited to, a M.2 or U.2 form factor. In this topology, a pair of non-volatile storage devices may be placed such that one non-volatile storage device on one side of a PCB may be fully overlapped with another non-volatile storage device on the other side. One or more pairs of non-volatile storage devices in clamshell configurations may share one channel. Conventionally, the signal routes for all non-volatile storage devices sharing one channel (e.g., data bus and signal paths) may be tightly matched (e.g., for resistance and capacitance), regardless of whether the non-volatile storage devices have same capacity. Embodiments according to the present disclosure provide a hybrid PCB topology and layout technique in support of mixed loading conditions that allow for sharing the data bus between non-volatile storage devices having different capacities (e.g., high-capacity and low-capacity devices) without sacrificing speed performance.

In an exemplary embodiment, there is provided a non-volatile storage system. The non-volatile storage system may comprise a printed circuit board (PCB), a first non-volatile storage device having a first capacity and attached to a first side of the PCB, a second non-volatile storage device having a second capacity and attached to a second side of the PCB, and a storage controller coupled to the first non-volatile storage device and the second non-volatile storage device by a shared channel. The second capacity may be different from the first capacity. The first non-volatile storage device and the second non-volatile storage device may be placed in a first clamshell configuration. The shared channel may have a first signal route to a first pin of the first non-volatile storage device and a second signal route to a second pin of the second non-volatile storage device. The first pin may have a first pin capacitance and the second pin may have a second pin capacitance. The first pin capacitance may be smaller than the second pin capacitance. The first signal route and the second signal route may share a main trunk and a first branch but have separate device branches, and the first signal route may have a first device branch that has a first extra resistor in series compared to a second device branch of the second signal route. The first extra resistor may be placed on the first side of the PCB.

In another exemplary embodiment, there is provided another non-volatile storage system that may comprise a printed circuit board (PCB), a first non-volatile storage device having a first capacity and attached to a first side of the PCB, a second non-volatile storage device having a second capacity and attached to a second side of the PCB, a third non-volatile storage device having a third capacity and attached to the first side of the PCB, a fourth non-volatile storage device having a fourth capacity and attached to the second side of the PCB, and a storage controller coupled to the first non-volatile storage device, the second non-volatile storage device, the third non-volatile storage device and the fourth non-volatile storage device by a shared channel. The second capacity may be different from the first capacity. The first non-volatile storage device and the second non-volatile storage device may be placed in a first clamshell configuration. The third capacity and the fourth capacity may be the same as the second capacity. The third non-volatile storage device and the fourth non-volatile storage device may be placed in a second clamshell configuration. The shared channel may have a first signal route to a first pin of the first non-volatile storage device, a second signal route to a second pin of the second non-volatile storage device, a third signal route to a third pin of the third non-volatile storage device and a fourth signal route to a fourth pin of the fourth non-volatile storage device. The first pin may have a first pin capacitance, the second pin may have a second pin capacitance, the third pin may have a third pin capacitance and the fourth pin may have a fourth pin capacitance. The first pin capacitance may be smaller than the second pin capacitance, the third pin capacitance and the fourth pin capacitance may be the same as the second pin capacitance. The first signal route and the second signal route may share a main trunk and a first branch but have separate device branches. The first signal route may have a first device branch that has a first extra resistor in series compared to a second device branch of the second signal route, the first extra resistor may be placed on the first side of the PCB. The third signal route and the fourth signal route may share the main trunk and a second branch but have separate tightly matched device branches. The second branch may be tightly matched to the first branch.

In yet another exemplary embodiment, there is provided yet another non-volatile storage system that may comprise a printed circuit board (PCB), a first non-volatile storage device having a first capacity and attached to a first side of the PCB, a second non-volatile storage device having a second capacity and attached to a second side of the PCB, a third non-volatile storage device having a third capacity and attached to the first side of the PCB, a fourth nonvolatile storage device having a fourth capacity and attached to the second side of the PCB, and a storage controller coupled to the first non-volatile storage device, the second non-volatile storage device, the third non-volatile storage device and the fourth non-volatile storage device by a shared channel. The second capacity may be different from the first capacity the third capacity may be the same as the second capacity, the fourth capacity may be the same as the first capacity. The first non-volatile storage device and the second non-volatile storage device may be placed in a first clamshell configuration; the third non-volatile storage device and the fourth non-volatile storage device may be placed in a second clamshell configuration. The shared channel may have a first signal route to a first pin of the first non-volatile storage device, a second signal route to a second pin of the second non-volatile storage device, a third signal route to a third pin of the third non-volatile storage device and a fourth signal route to a fourth pin of the fourth non-volatile storage device. The first pin may have a first pin capacitance, the second pin may have a second pin capacitance, the third pin may have a third pin capacitance and the fourth pin may have a fourth pin capacitance. The first pin capacitance may be smaller than the second pin capacitance, the third pin capacitance may be the same as the second pin capacitance, the fourth pin capacitance may be the same as the first pin capacitance. The first signal route and the second signal route may share a main trunk and a first branch but have separate device branches, and the first signal route may have a first device branch that has a first extra resistor in series compared to a second device branch of the second signal route. The first extra resistor may be placed on the first side of the PCB. The third signal route and the fourth signal route may share the main trunk and a second branch but have separate device branches. The second branch may be tightly matched with the first branch, and the fourth signal route may have a fourth device branch that has a second extra resistor in series compared to a third device branch of the third signal route. The second extra resistor may be placed on the second side of the PCB.

DETAILED DESCRIPTION

Figure 1A:
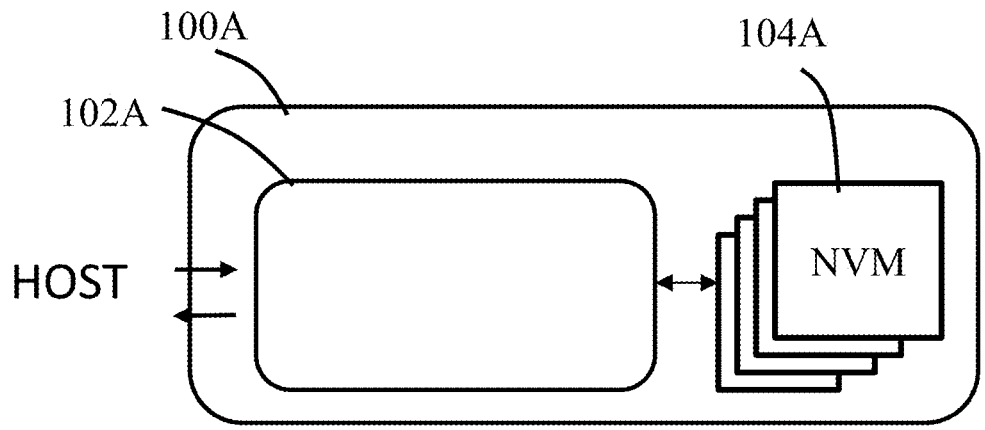
FIG. 1A schematically shows a non-volatile storage system in accordance with an embodiment of the present disclosure.

Specific embodiments according to the present disclosure will now be described in detail with reference to the accompanying figures. Like elements in the various figures are denoted by like reference numerals for consistency.

The present disclosure provides a hybrid PCB topology and layout technique in support of mixed loading conditions that allow for sharing the data bus of a shared channel between non-volatile storage devices having different capacities without sacrificing speed performance.

In some embodiments, one or more pairs of non-volatile storage devices may be attached to a PCB with each pair placed in a clamshell style. A resistor may be introduced in series to the branch connecting a low-capacity non-volatile storage device, and next to and around the low-capacity non-volatile storage device. The PCB traces from the resistors to the low-capacity non-volatile storage device pins may be routed on the same side of PCB layer as the low-capacity non-volatile storage device with minimum trace lengths.

In some embodiments, a non-volatile storage system (e.g., an SSD) with hybrid PCB topology may implement electrical mirroring controlled by a storage controller. For example, one non-volatile storage device of a pair of non-volatile storage devices in a clamshell configuration may have its data pins connected in a reversed order to the storage controller's data pins. The controller may execute firmware to determine whether electrical mirroring is enabled or disabled for each individual non-volatile memory device and implement a set of registers with bits corresponding to each individual non-volatile memory device to be set by the firmware during a configuration process (e.g., power on initialization). Once the electrical mirroring is enabled for a non-volatile memory device, the controller may perform read and write operations for this non-volatile storage device accordingly, for example, reverse the order of data bits before sending it to the non-volatile memory device with reversed data pins, and also reverse the order of data bits received from the non-volatile memory device with reversed data pins.

As used herein, a non-volatile memory device may be a computer storage device that can maintain stored information after being powered off, and the stored information may be retrieved after being power cycled (turned off and back on). Non-volatile storage devices may include NAND flash memories, NOR flash memories, magnetoresistive random Access Memory (MRAM), resistive random access memory (RRAM), phase change random access memory (PCRAM), Nano-RAM, etc. In the description, a NAND flash may be used as an example to demonstrate the hybrid PCB techniques. However, various embodiments according to the present disclosure may implement the techniques with other types of non-volatile storage devices.

FIG. 1A schematically shows a non-volatile storage system 100A in accordance with an embodiment of the present disclosure. The non-volatile storage system 100A may comprise a non-volatile storage controller 102A and a plurality of non-volatile memories (NVMs) 104. The non-volatile storage system 100A may provide data storage and/or access to stored data to a host when it is coupled to the host. The plurality of NVMs 104A may be, for example, NAND devices. The plurality of NVMs 104A may be coupled to the non-volatile storage controller 102A by one or more channels with multiple NVMs coupled to one channel (e.g., one channel shared by the multiple NVMs). The plurality of NVMs 104A may be placed on a PCB in conventional clamshell configurations. In each conventional clamshell configuration, one of a pair of NVMs may be placed at a first side of a PCB and the other one of the pair of NVMs at the same position but a second side (e.g., opposite side) of the PCB, and both NVMs may have data pins connected to the data bus of a channel in a regular order. For example, data pins of both NVMs may be coupled to the data bus in a matching order as DQ[7:0] to DQ[7:0].

The non-volatile storage controller 102A may be any storage controller known in the art or any further developed storage controller for non-volatile storage systems (e.g., SSD). For example, the non-volatile storage controller 102A may comprise a processor, and a memory (e.g., on-chip SRAM and/or off-chip DRAM). The processor may be a computer processor, such as, but not limited to, a microprocessor or a microcontroller. The processor may be configured to execute computer executable instructions (e.g., firmware) stored in the memory to configure, control and program the behaviors of the controller and the system 100A. In at least one embodiment, the processor and the memory may be integrated in one Integrated Circuit (IC) chip.

Figure 1B:
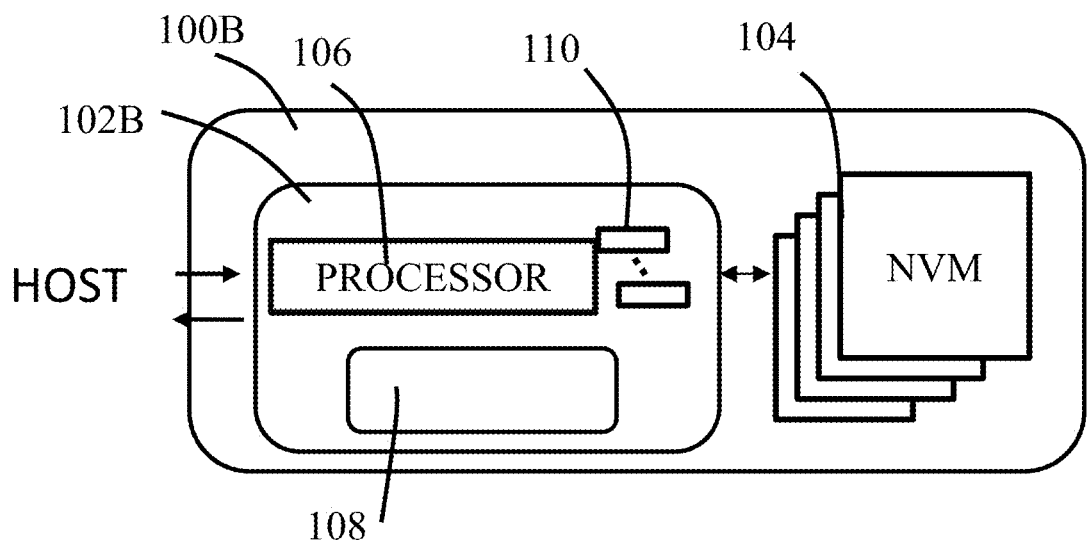
FIG. 1B schematically shows a non-volatile storage system in accordance with another embodiment of the present disclosure.

FIG. 1B schematically shows a non-volatile storage system 100B in accordance with another embodiment of the present disclosure. The non-volatile storage system 100B may comprise a non-volatile storage controller 102B and a plurality of non-volatile memories (NVMs) 104B. The non-volatile storage system 100B may provide data storage and/or access to stored data to a host when it is coupled to the host. The plurality of NVMs 104B may be, for example, NAND devices. In some embodiments, one NAND device may comprise one NAND target that may be controlled by a chip enable (CE) signal. In some other embodiments, one NAND device may comprise a plurality of NAND targets (e.g., two targets) that each NAND target may have its own CE signal. As used herein, a storage target in a NVM storage device may be a unit of the storage device accessed by a chip enable signal and may be simply referred to as a target. The plurality of NVMs 104B may be connected to the non-volatile storage controller 102B by a plurality of channels with each target being connected to one channel and one channel shared by a plurality of targets.

At least two NVMs of the plurality of NVMs 104 may be put in a mirrored configuration. The mirrored configuration may be a special clamshell configuration, in which one of the two NVMs in the clamshell configuration may have data pins connected to the data bus of a channel in a regular order and the other one of the two NVMs in the clamshell configuration may have data pins connected to the data bus in a reversed order. As used herein, a NVM may be referred to as connected in a reversed order when its data pins are connected to a data bus in the reversed order and such a reversely connected NVM may also be referred to as a flipped NVM, a mirrored NVM, or a NVM in a mirrored mode. Further, a NVM connected in a regular data bit order may be referred to as a not-flipped NVM or a non-mirrored NVM.

The non-volatile storage controller 102B may comprise a processor 106, a non-transitory computer-readable storage media 108 and a plurality of registers 110. The processor 106 may be a computer processor, such as, but not limited to, a microprocessor or a microcontroller. In some embodiments, each of the plurality of registers 110 may have a plurality of bits such that each target of the plurality of NVMs 104 may have a corresponding bit in the plurality of registers 110. The plurality of registers 110 may be configured to indicate which target of the plurality of NVMs 104B may be connected in a reversed order. In at least one embodiment, some or all of the processor 106, the storage media 108 and registers 110 may be integrated in one Integrated Circuit (IC) chip.

In one embodiment, each register of the plurality of registers 110 may be assigned to one channel (e.g., one register per channel) and each register bit may be assigned to one target of one NVM device of the channel (e.g., one bit per CE). In an example implementation, the register may be referred to as DQ_MIRROR_EN as shown in Table 1 below, in which a bit may be set (e.g., set to one) to enable the electrical mirroring mode of a corresponding NAND target.

TABLE 1

Register definition of DQ_MIRROR_EN

| Register Name | Bit-Width | Description |
| --- | --- | --- |
| DQ_MIRROR_EN | [15:0] | Each bit corresponding to one CE<br>0 h: electrical mirror mode disabled<br>1 h: electrical mirror mode enabled<br>(e.g., DQ0 coupled to DQ7 of data bus;<br>DQ1 coupled to DQ6 of data bus; . . . ;<br>DQ7 coupled to DQ0 of data bus) |

In the example of Table 1, the register may have a 16-bit width. With each bit corresponding to one NAND target, the 16-bit register may support up to 16 targets per channel. The register bits may be set based on system topology. Once a DQ_MIRROR_EN register bit is set to 1, the controller 102B may be notified that the corresponding NAND device (e.g., the NAND device containing the corresponding target) has the data pins connected in a reverse order, so the controller may need to reverse the data bit order internally before sending the data or after receiving the data.

It should be noted that the example uses a register bit set to one (1) to indicate a corresponding NVM target may be connected in a reversed order, but in some embodiments, a register bit set to zero (0) may be used to indicate a corresponding NVM target connected in a reversed order. Moreover, it should be noted that the register may have a different width compared to the data bus. In the example shown above, the data bus may have an 8-bit width but the register may have 16 bits.

In some embodiments, the register bits of the plurality of registers 110 corresponding to reversely connected NVMs of the plurality of NVMs 104 may be set during an electrical mirroring configuration process. For example, the electrical mirroring configuration process may be part of an initialization process of the non-volatile storage system 100B performed when the non-volatile storage system 100B is powered on or reset. During the electrical mirroring configuration process, the processor 106 may execute computer instructions (e.g., firmware) stored in the non-transitory computer-readable storage media 108 to determine system topology and set the register bits based on the determined system topology. In some embodiments, the non-transitory computer-readable storage media 108 may be a read only memory (e.g., Erasable Programmable Read Only Memory or other suitable ROM) typically used for storing firmware, which may be low-level software instructions that when executed by the processor 106, may cause the processor 106 to directly access the registers of the controller, to configure, control and program the behaviors of the controller and the system.

In one embodiment, the processor 106 may execute computer instructions stored in the non-transitory computer-readable storage media 108 to determine which NVM of the plurality of NVMs 104B may be connected in a reversed order and set bits corresponding to targets in the reversely connected NVMs in the plurality of registers 110. For example, the firmware may be programmed to designate one side as a regular order connection side (e.g., top side) and another side as the reversed order connection side (e.g., bottom side) and the processor 106 may determine which NVMs of the plurality of NVMs 104B may be positioned on the regular order connection side and which NVMs of the plurality of NVMs 104B may be positioned on the reversed order connection side.

During operations for the non-volatile storage system 100B, the non-volatile storage controller 102B may be configured to reverse data bit orders before sending data to a reversely connected target and after receiving data from a reversely connected target. In one embodiment, the processor 106 may execute software instructions to check registers 110 to determine whether a target is reversely connected and carry out data reversal operations if necessary. If a NAND target is connected in regular order, data may be sent from the non-volatile storage controller 102B to the NAND target and received from the NAND target without any data reversal operations.

If a NAND target is reversely connected (e.g., electrical mirroring register bit enabled), for a write operation, the non-volatile storage controller 102B may reverse the data bit order from DQ[7:0] to DQ[0:7] before sending the data out on the data bus. That is, the non-volatile storage controller 102B may swap data bits DQ[0] and DQ[7], swap data bits DQ[1] and DQ[6], and so on for all data bits. The NAND device may receive the data in the original order of DQ[7:0]. That is, because the data pins of the NAND device are connected to the data bus in a reversed order, data pin DQ[0] of the NAND device may receive the data bit for DQ[0] in the non-volatile storage controller 102B before the reversal operation, data pin DQ[1] of the NAND device may receive the data bit for DQ[1] in the non-volatile storage controller 102B before the reversal operation, and so on.

For a read operation with the mirrored NAND device, the non-volatile storage controller 102B may receive the data of DQ[7:0] in the reversed order as DQ[0:7]. The non-volatile storage controller 102B may determine that the received data is in the reversed data bit order by checking the corresponding register bit in the registers 110, and then perform a data bit order reversal to recover the data in the original order as DQ[7:0].

Figure 2:
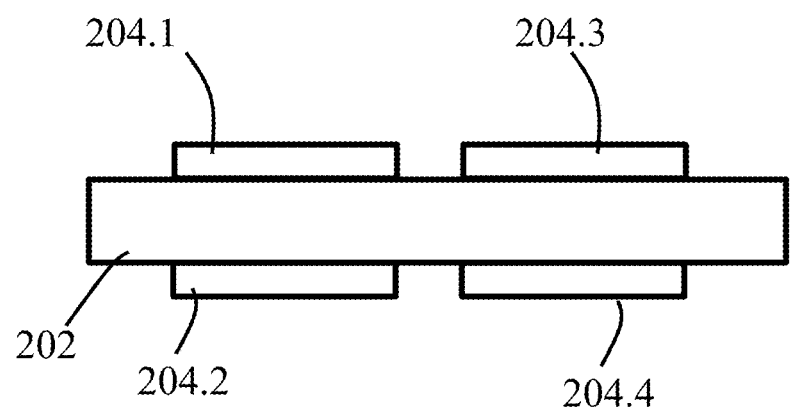
FIG. 2 schematically shows two pairs of non-volatile storage devices in clamshell configurations in accordance with an embodiment of the present disclosure.

FIG. 2 schematically shows two pairs of non-volatile storage devices in clamshell configurations in accordance with an embodiment of the present disclosure. The two non-volatile storage devices 204.1 and 204.2 may be attached to a same position but opposite sides of a substrate or base 202, respectively. That is, the two non-volatile storage devices 204.1 and 204.2 may overlap with each other in a clamshell configuration and referred to as a pair of non-volatile storage devices in a clamshell configuration. The substrate 202 may be a printed circuit board (PCB) or other suitable substrate. The two non-volatile storage devices 204.3 and 204.4 may be attached to another position but opposite sides of the substrate or base 202, respectively. That is, the two non-volatile storage devices 204.3 and 204.4 may overlap with each other in another clamshell configuration and referred to as another pair of non-volatile storage devices in another clamshell configuration.

In one embodiment, the two pairs of non-volatile storage devices (e.g., 204.1 and 204.2, 204.3 and 204.4) may be four non-volatile storage devices of the plurality of NVMs 104A and the substrate 202 may be a PCB in a non-volatile storage system 100A. That is, the two pairs of non-volatile storage devices may be in conventional clamshell configurations. Although not shown, the storage controller 102A may also be placed on one side of the substrate 202.

In another embodiment, the two pairs of non-volatile storage devices (e.g., 204.1 and 204.2, 204.3 and 204.4) may be in mirrored configurations. For example, these non-volatile storage devices may be four non-volatile storage devices of the plurality of NVMs 104B and the substrate 202 may be a PCB in a non-volatile storage system 100B. Although not shown, the storage controller 102B may also be placed on one side of the substrate 202.

Figure 3A:
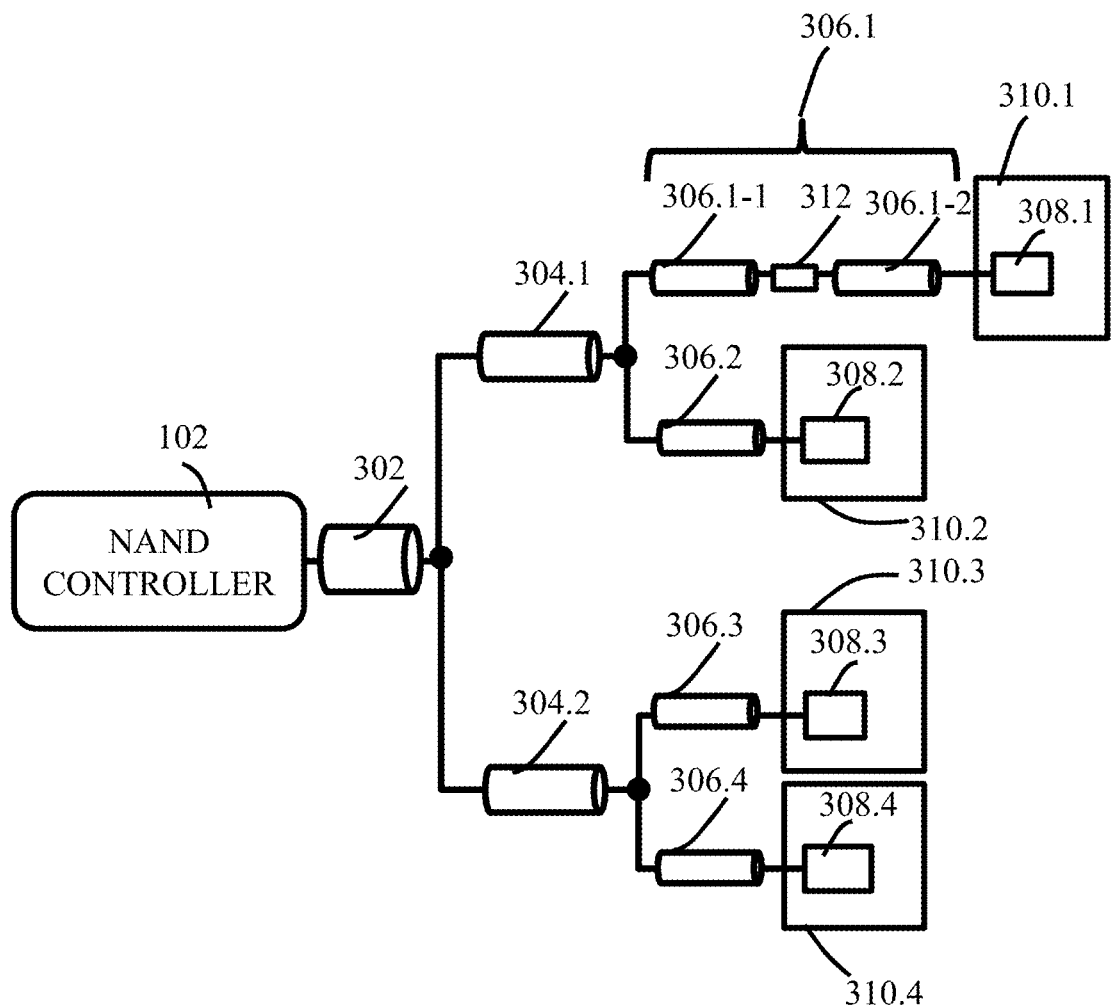
FIG. 3A schematically shows signal routes for two pairs of non-volatile storage devices in clamshell configurations in accordance with an embodiment of the present disclosure.

FIG. 3A schematically shows signal routes for two pairs of non-volatile storage devices in clamshell configurations in accordance with an embodiment of the present disclosure. Non-volatile storage devices 310.1 and 310.2 may be a pair of non-volatile storage devices in a clamshell configuration. Non-volatile storage devices 310.3 and 310.4 may be another pair of non-volatile storage devices in another clamshell configuration. These two pairs of non-volatile storage devices may be four NVMs of the plurality of NVMs 104 and share a channel coupled to the non-volatile storage controller 102.

Signals on some high-speed signal lines of the shared channel for one non-volatile storage device may be adversely affected by reflections from the same signal lines for other non-volatile storage devices sharing the same channel. These high-speed signal lines may include the signal lines for the data bus (e.g., DQ), the strobe signals (e.g., DQS), and the read enable signals (e.g., RE). The effect of the reflections may depend on the pin capacitance of the pins of the non-volatile storage devices. The pin capacitance may also be referred to as pin capacitive loading or capacitive pin load. In some embodiments, the pin capacitance may depend on the capacity of the non-volatile storage devices. For example, a high-capacity non-volatile storage device may have a heavy (or larger) pin capacitive loading while a low-capacity non-volatile storage device may have a light (or smaller) pin capacitive loading. For example, a high-capacity non-volatile storage device may contain high-capacity octo-die packages (ODP) and have a capacity of 512 megabytes with a pin capacitance of 8-pF (picofarad); a low-capacity non-volatile storage device may contain medium-capacity quad-die packages (QDP) and have a capacity of 256 megabytes with a pin capacitance of 4-pF.

The non-volatile storage device 310.1 may comprise a pin 308.1 coupled to the non-storage controller 102 by a trunk 302, a branch 304.1 and a device branch 306.1. That is, the signal route for the non-volatile storage device 310.1 may include the trunk 302, the branch 304.1 and the device branch 306.1. The device branch 306.1 may have two segments 306.1-1 and 306.1-2 with a resistor 312 inserted between the two segments and connected to the two segments 306.1-1 and 306.1-2 in series. The non-volatile storage device 310.2 may comprise a pin 308.2 coupled to the non-storage controller 102 by the trunk 302, the branch 304.1, a device branch 306.2. That is, the signal route for the non-volatile storage device 310.2 may include the trunk 302, the branch 304.1 and the device branch 306.2. The non-volatile storage device 310.3 may comprise a pin 308.3 coupled to the non-storage controller 102 by the trunk 302, a branch 304.2 and a device branch 306.3. That is, the signal route for the non-volatile storage device 310.3 may include the trunk 302, the branch 304.2 and the device branch 306.3.

The non-volatile storage device 310.4 may comprise a pin 308.4 coupled to the non-storage controller 102 by the trunk 302, the branch 304.2 and a device branch 306.4. That is, the signal route for the non-volatile storage device 310.4 may include the trunk 302, the branch 304.2 and the device branch 306.4. It should be noted that the signal route illustrated FIG. 3A may be represent one signal line of a plurality of high-speed signal lines (e.g., DQ[7:0], DQSP/DQSN, RE_P/RE_N) and there may be a plurality of resistors 312 so that each of such signal routes may have its own resistor 312.

In one embodiment, each of the pins 308.1, 308.2, 308.3 and 308.4 may be a pin for one signal line for high-speed signals. For example, the high-speed signals may include the signals for the data bus (e.g., DQ[7:0]), the strobe signals (e.g., DQSP/DQSN), and the read enable signals (e.g., RE_P/RE_N). The pins 308.2, 308.3 and 308.4 may have a same pin capacitive loading and the pin 308.1 may have a different pin capacitive loading. For example, the non-volatile storage devices 310.2, 310.3 and 310.4 may be high-capacity devices with heavy pin capacitive loading and the non-volatile storage device 310.1 may be a low-capacity device with light pin capacitive loading. The trunk 302 may be shared by all non-volatile storage devices 310.1 through 310.4. The branch 304.1 may be shared by the non-volatile storage devices 310.1 and 310.2. The branch 304.2 may be shared by the non-volatile storage devices 310.3 and 310.4. To achieve optimal signal integrity and speed performance, the two branches of 304.1 and 304.2 may be tightly length matched with each other with minimal skews, and the three device branches of 306.2, 306.3 and 306.4 may also be tightly length matched as well. The resistor 312 may be inserted into the device branch 306.1 that is to the low-capacity device 310.1 and may help suppress signal reflections from the other three high-capacity devices 310.2, 310.3 and 310.4.

In some embodiments, to achieve an optimal signal integrity, the trunk 302 may have the lowest trace impedance among all the sections, the branches 304.1 and 304.2 may have an intermedia impedance that is higher than the trunk and lower than the device branches from 306.1 to 306.4. and the device branches may have the highest impedance. As an example, the trunk 302 may have an impedance of 30~35 ohms, each of the branches 304.1 and 304.2 may have an impedance of about 40 ohms and a length of less than or equal to 400 mil, each of the device branches 306.2, 306.3 and 306.4 may have an impedance of 55 ohms and a length of less than or equal to 28 mil, the series resistor 312 may have a value of 22-ohms, and each of the two device branch segments 306.1-1 and 306.1-2 may have an impedance of 55 ohms and have a length ranged from 200-mil to 300-mil.

Figure 3B:
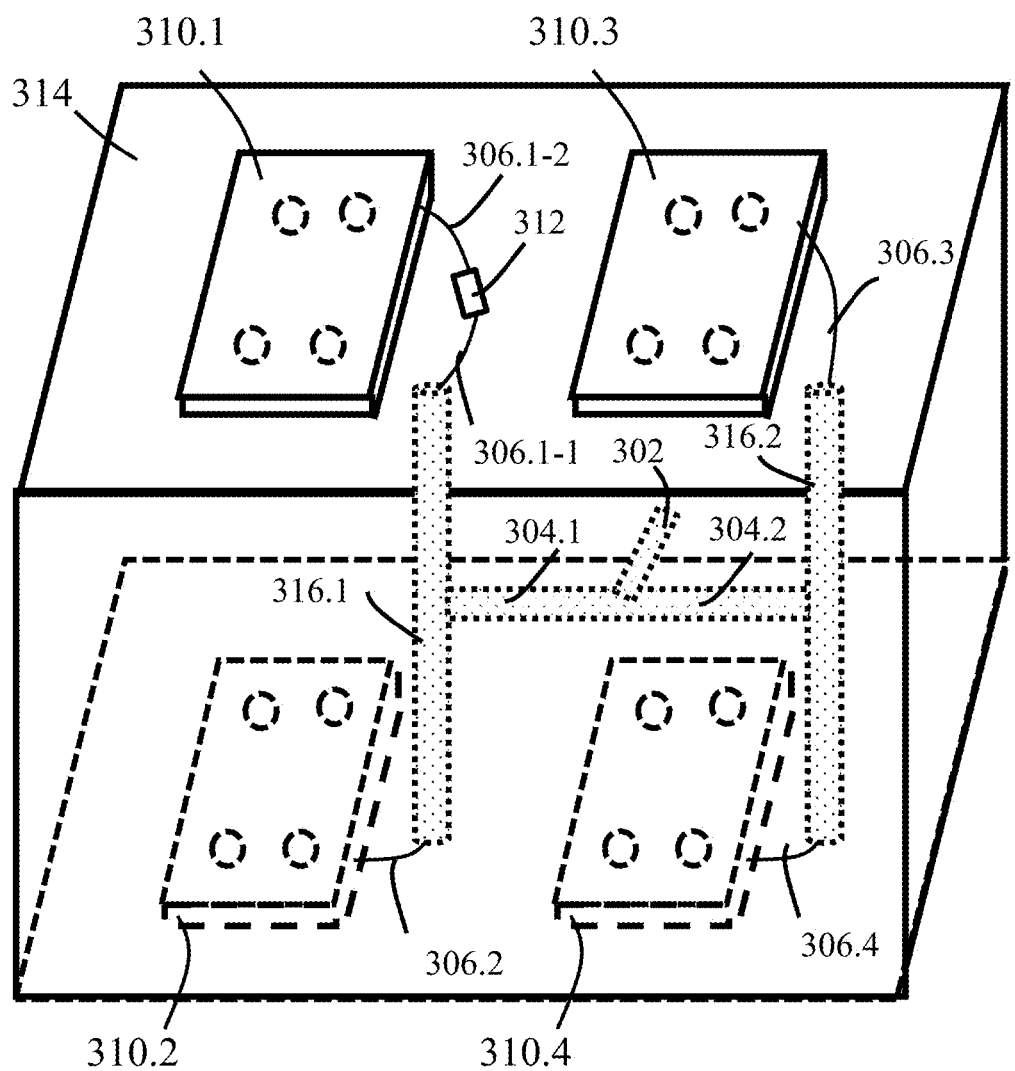
FIG. 3B schematically shows arrangement of two pairs of non-volatile storage devices in clamshell configurations on a printed circuit board in accordance with an embodiment of the present disclosure.

FIG. 3B schematically shows arrangement of two pairs of non-volatile storage devices of FIG. 3A on a printed circuit board 314 in accordance with an embodiment of the present disclosure. The PCB 314 may be an embodiment of the substrate or base 202. In this example, the non-volatile storage devices 310.1 and 310.3 may be placed on the top layer of the PCB 314, and the non-volatile storage devices 310.2 and 310.4 may be placed on the bottom layer. The non-volatile storage devices 310.3 and 310.4 may be high-capacity devices and placed in a clamshell configuration. The non-volatile storage devices 310.1 and 310.2 may also be placed in a clamshell configuration, in which the non-volatile storage device 310.2 may be a high-capacity device while the non-volatile storage device 310.1 may be a low-capacity device. The trunk 302 may be the main trunk section that connects to the storage controller. The two branches 304.1 and 304.2 may be tightly matched and have a length ranged from 300-mil to 400-mil. There are two vias 316.1 and 316.2 that bring the branches 304.1 and 304.2 to the top and bottom layers of the PCB 314. The series resistor 312 may be placed next to the non-volatile storage device 310.1. The device branch segment 306.1-1 may be a short trace routed from the via 316.1 to the resistor 312, and the device branch segment 306.1-2 may be another short trace routed from the resistor 312 to the pin 308.1 pin of the non-volatile storage device 310.1.

In embodiments that electrical mirroring technique may be employed, the lengths of branches 304.1 and 304.2 may be reduced to less than 30-mil. For example, in an embodiment of the non-volatile storage system 100B, each pair of non-volatile storage devices (e.g., 310.1 and 310.2, 310.3 and 310.4) may be in a mirrored configuration and the storage controller 104B may be configured for electrical mirroring (e.g., with firmware in the memory 108 and registers 110). In such embodiments, data pins of the pair of devices in a mirrored configuration may be matched and mirrored on two sides of a PCB, the vias may be placed close to the pins and a very short trace may be routed from the vias to the data pins. This may help further improve the NAND interface speed performance. The storage controller 102B in such embodiments may be configured to perform the electrical mirroring configuration process, and read and write operations for mirrored devices accordingly.

In contrast, in embodiments where each pair of non-volatile storage devices (e.g., 310.1 and 310.2, 310.3 and 310.4) may be in a conventional clamshell configuration, the lengths of branches 304.1 and 304.2 may be ranged from 50-mil to 200-mil when the electrical mirroring technique is not available. In such embodiments, the same DQ pins of the two non-volatile storage devices in a clamshell configuration may be in symmetrical positions with respect to the center line of the pair of devices. As a result, the same two DQ pins (e.g., DQ[0] of the non-volatile storage device 310.1 and DQ[0] of the non-volatile storage device 310.2) may be connected by vias placed along the center line of the NAND devices, and there may be relatively long traces routed from the vias to the pins.

Figure 3C:
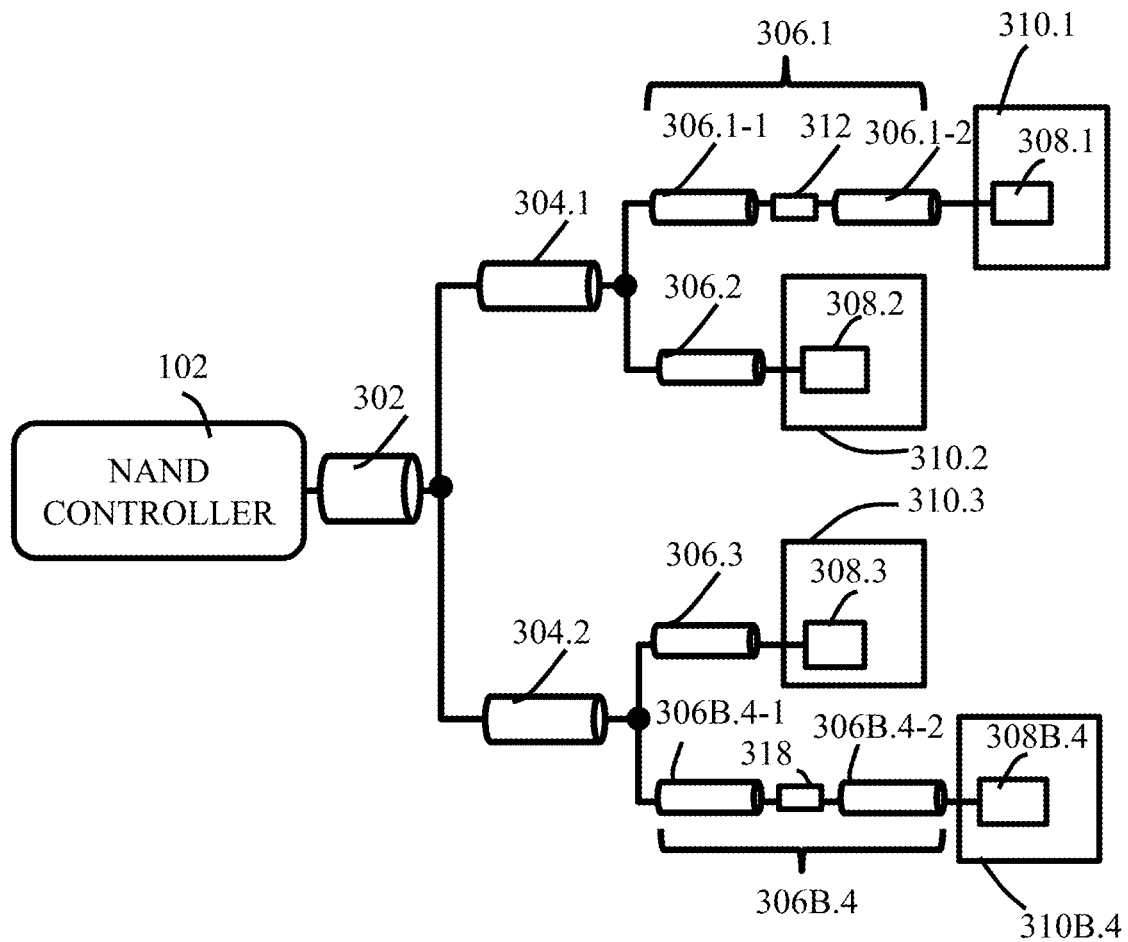
FIG. 3C schematically shows signal routes for two pairs of non-volatile storage devices in clamshell configurations in accordance with another embodiment of the present disclosure.

FIG. 3C schematically shows signal routes of two pairs of non-volatile storage devices in clamshell configurations in accordance with another embodiment of the present disclosure. The non-volatile storage devices 310.1, 310.2 and 310.3 may be the same as in FIG. 3A. The non-volatile storage device 310.4 of FIG. 3A may be replaced with a non-volatile storage device 310B.4 in FIG. 3C, and the device branch 306.4 may be replaced with a device branch 306B.4. The non-volatile storage device 310B.4 may have a pin 308B.4. The device branch 306B.4 may have two segments 306B.4-1 and 306B.4-2 with a resistor 318 inserted between the two segments and connected to the two segments in series. The pin 308B.4 may have a pin capacitive loading different from the pin capacitive loading of the pins 308.2 and 308.3. For example, the non-volatile storage devices 310.2 and 310.3 may be high-capacity devices with heavy pin capacitive loading and the non-volatile storage devices 310.1 and 310B.4 may be low-capacity devices with light pin capacitive loading. To achieve optimal signal integrity and speed performance, the resistor 312 may be inserted into the device branch 306.1 connecting to the low-capacity device 310.1 and the resistor 318 may be inserted into the device branch 306B.4 connecting to the low-capacity device 310B.4. The resistors 312 and 318 may help suppress signal reflections from the high-capacity devices 310.2 and 310.3.

As an example, the series resistor 318 may also have a value of 22-ohms, and two device branch segments 306B.4-1 and 306B.4-2 may also have an impedance of 55 ohms and have a length ranged from 200-mil to 300-mil.

Figure 3D:
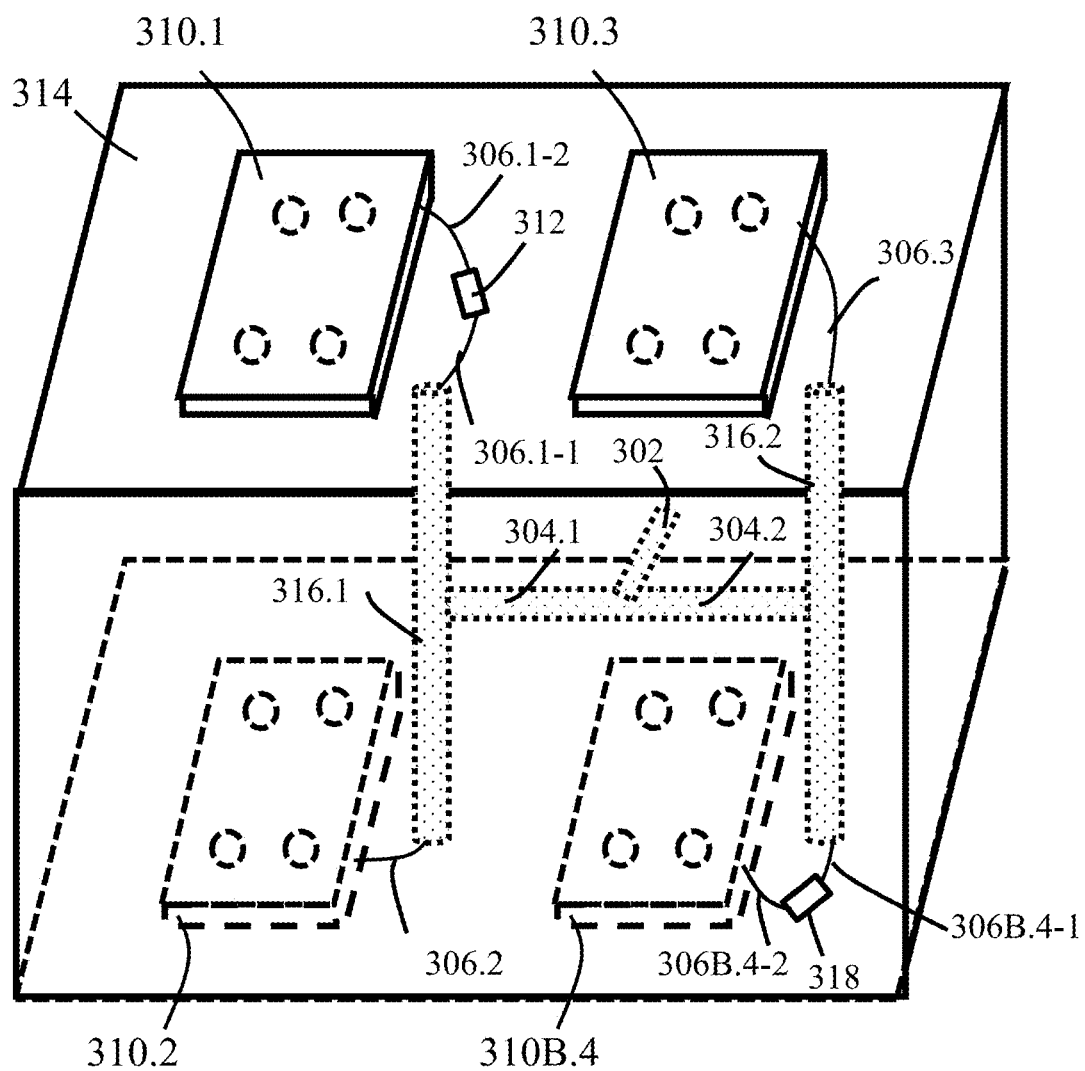
FIG. 3D schematically shows arrangement of two pairs of non-volatile storage devices in clamshell configurations on a printed circuit board in accordance with another embodiment of the present disclosure.

FIG. 3D schematically shows arrangement of two pairs of non-volatile storage devices of FIG. 3C on the PCB 314 in accordance with an embodiment of the present disclosure. In this example, the non-volatile storage devices 310.1 and 310.3 may be placed on the top layer of the PCB 314, and the non-volatile storage devices 310.2 and 310B.4 may be placed on the bottom layer. The non-volatile storage devices 310.1 and 310.2 may be placed in a clamshell configuration, in which the non-volatile storage device 310.2 may be a high-capacity device while the non-volatile storage device 310.1 may be a low-capacity device. The non-volatile storage devices 310.3 and 310B.4 may also be placed in a clamshell configuration, in which the non-volatile storage device 310.3 may be a high-capacity device while the non-volatile storage device 310B.4 may be a low-capacity device. The trunk 302 may be the main trunk section that connects to the storage controller. In addition to the series resistor 312, the series resistor 318 may be added and placed next to the non-volatile storage device 310B.4. The device branch segment 306B.4-1 may be a short trace routed from the via 316.2 to the resistor 318, and the device branch segment 306B.4-2 may be another short trace routed from the resistor 318 to the pin 308B.4 of the non-volatile storage device 310B.4.

In one embodiment, as shown in FIG. 3D, the low-capacity devices 310.1 and 310B.4 may be placed on different PCB layers. It should be noted that there may be multiple resistor 312s and multiple resistor 318s (e.g., one for each of the high-speed signals) so placing the two low-capacity devices 310.1 and 310B.4 may help to ensure that there is sufficient space for placement and routings to and from the resistors. However, placing low-capacity devices 310.1 and 310B.4 on different PCB layers may be optional and not required. Moreover, the low-capacity devices 310.1 and 310B.4 may be placed into two non-overlapping positions for the same purpose of facilitating routings to and from the resistors 312 and 318. This may also be optional and not required.

It should be noted that although embodiments shown in FIGS. 3A-3D have two pairs of non-volatile storage devices in clamshell configurations, some embodiments may have one pair and some other embodiments may have more than two pairs of non-volatile storage devices in clamshell configurations. For example, one embodiment may have the low-capacity non-volatile storage device 310.1 and high-capacity non-volatile storage device 310.2 sharing one channel, and the non-volatile storage devices 310.3 and 310.4 may be optional.

Figure 4:
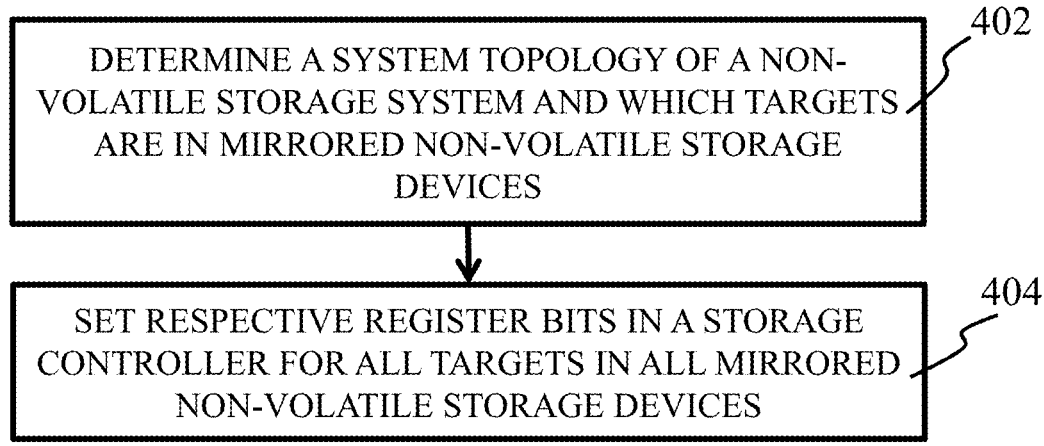
FIG. 4 is a flowchart of an electrical mirroring configuration process in accordance with an embodiment of the present disclosure.

FIG. 4 is a flowchart for an electrical mirroring configuration process 400 in accordance with an embodiment of the present disclosure. In block 402, a system topology of a non-volatile storage system and which targets are in mirrored non-volatile storage devices may be determined. For example, in some embodiments, the NAND controller 102B may be configured to determine the system topology and which targets are in mirrored non-volatile storage devices for the non-volatile storage system 100B during an electrical mirroring configuration process. In one embodiment, the system topology may include how many non-volatile storage devices are in the non-volatile storage system 100B, the NVMs 104B are connected to the controller 102B in how many channels, how many targets are in each of the NVMs 104B and which targets in the NVMs 104B belong to which channel.

In block 404, respective register bits in a storage controller may be set for all targets in all mirrored non-volatile storage devices. For example, in some embodiments, the NAND controller 102B may comprise a plurality of registers. In one embodiment, one channel may be assigned one register with each bit of the register corresponding to one target in the channel. Register bits corresponding to targets in mirrored non-volatile storage devices may be set (e.g., electrical mirroring enabled).

Figure 5:
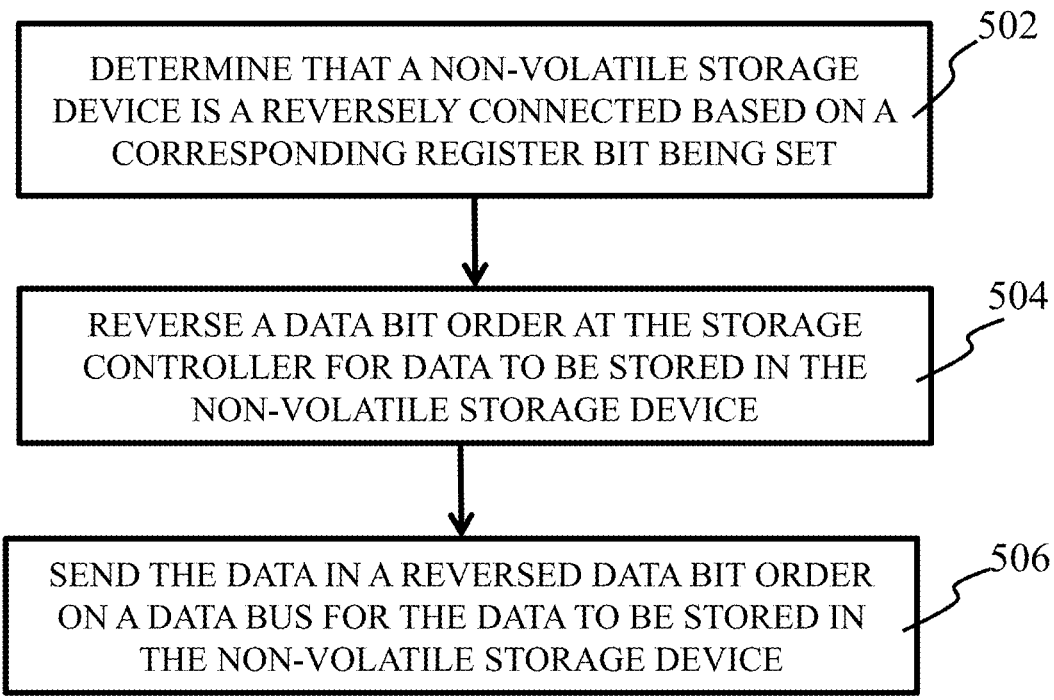
FIG. 5 is a flowchart of a process for a write operation to a mirrored NAND device in accordance with an embodiment of the present disclosure.

FIG. 5 is a flowchart of a process 500 for a write operation to a mirrored NAND device in accordance with an embodiment of the present disclosure. In block 502, a non-volatile storage device of the non-volatile storage system may be determined to be reversely connected based on a corresponding register bit being set. In one embodiment, a register bit corresponding to a target in a mirrored NVM may be set to indicate that the data pins for the target may be reversely connected. In block 504, a data bit order for data to be stored in the non-volatile storage device may be reversed at the storage controller. The data to be stored in the non-volatile storage device may be in an original data bit order at the storage controller before the reversal. In block 506, the data may be sent in a reversed data bit order on a data bus for the data to be stored in the non-volatile storage device. In various embodiments, because the target is in a mirrored storage device, the data pins are reversely connected, the data will be received and stored in the mirrored storage device in its original data bit order.

Figure 6:
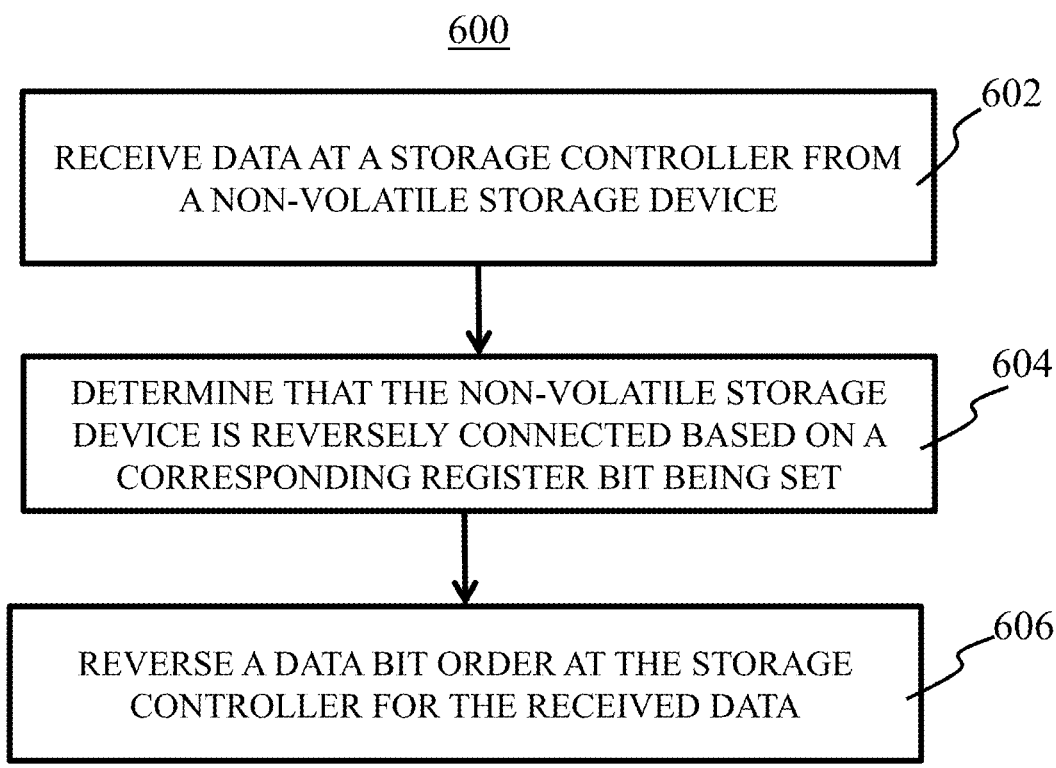
FIG. 6 is a flowchart of a process for a read operation from a mirrored NAND device in accordance with an embodiment of the present disclosure.

FIG. 6 is a flowchart of a process 600 for a read operation from a mirrored NAND device in accordance with an embodiment of the present disclosure. In block 602, data may be received at the storage controller from a non-volatile storage device of the non-volatile storage system. In block 604, the storage controller may determine that the non-volatile storage device is a mirrored non-volatile storage device based on a corresponding register bit being set. In block 606, the storage controller may reverse a data bit order for the received data.

Each of the processes 400, 500 and 600 may be implemented using software (e.g., executable by a computer processor (CPU, GPU, or both)), hardware (e.g., a field-programmable gate array (FPGA) or an application-specific IC (ASIC), firmware, or any suitable combination of the three. In one embodiment, for example, the electrical mirroring configuration process 400 may be implemented in hardware circuitry (e.g., FPGA or ASIC). In another embodiment, the electrical mirroring configuration process 400 may be implemented in firmware and stored in a read-only memory (e.g., storage 108), and performed by the processor 106 executing the firmware. Moreover, the processes 500 and 600 may be programmed in computer processor executable instructions, stored in a non-transitory machine-readable medium (e.g., NVMs 104B, CD, DVD, etc.) and performed by a computer processor (e.g., a microprocessor or a microcontroller) executing the executable instructions.

Embodiments may provide an improvement over the conventional balanced-tree topology. In the balanced-tree topology, the branches along the signal routes are tightly length matched, and device branches are also all tightly length matched. This widely adopted balanced-tree topology, however, only works well when all NAND devices sharing one data bus have the same capacity and capacitive pin loads. The NAND interface speed performance degrades severely with mixed loading conditions where high-capacity NAND devices share one data bus with low-capacity NAND devices. For example, if four NAND devices are placed in two pairs of clamshell configurations and three out of four NAND devices are high-capacity devices and one device is a low-capacity device, the low-capacity device will suffer from heavy reflections from the other three high-capacity NAND devices, and experience significant signal integrity and speed degradations.

But mixed loading conditions, or mixing NAND devices of various capacities is often required by customers to achieve various capacity grades of end SSD products. For example, an SSD may have a total of 16 NAND devices on the PCB. If all 16 NAND devices are high-capacity octo-die packages (ODP), the SSD capacity can be 8 terabytes. If all 16 NAND devices are low-capacity quad-die packages (QDP), the SSD capacity can be 4 terabytes. If some customers need intermediate capacities in between, such as 5, 6, 7 terabytes, NAND devices with different capacities have to be mixed up and share the same data bus. An alternative solution could be using all ODP devices for some channels, and all QDP devices for some other channels.

However, this solution will reduce the parallelism capacity of the NAND controller and lead to further performance degradation, as well.

Embodiments provide an innovative PCB topology and layout solution that addresses the signal integrity problems of the balanced-tree topology. For example, an SSD can achieve 8 terabytes of total capacity if all NAND devices are high-capacity NAND devices, and can achieve 4 terabytes if all NAND devices are low-capacity NAND devices. Then, the hybrid PCB topology shown in FIG. 3A and FIG. 3B may allow 25% of NAND devices to be low-capacity devices and other 75% of NAND devices to be high-capacity devices, thus the SSD may have a total capacity of 7 terabytes. In addition, the hybrid PCB topology shown in FIG. 3C and FIG. 3D may allow 50% low-capacity NAND devices and 50% high-capacity NAND devices, and can achieve a total capacity of 6 terabytes. Both hybrid PCB topologies may increase the NAND interface speed by 30~50% over the conventional balanced-tree topology.

In an exemplary embodiment, there is provided a non-volatile storage system. The non-volatile storage system may comprise a printed circuit board (PCB), a first non-volatile storage device having a first capacity and attached to a first side of the PCB, a second non-volatile storage device having a second capacity and attached to a second side of the PCB, and a storage controller coupled to the first non-volatile storage device and the second non-volatile storage device by a shared channel. The second capacity may be different from the first capacity. The first non-volatile storage device and the second non-volatile storage device may be placed in a first clamshell configuration. The shared channel may have a first signal route to a first pin of the first non-volatile storage device and a second signal route to a second pin of the second non-volatile storage device. The first pin may have a first pin capacitance and the second pin may have a second pin capacitance. The first pin capacitance may be smaller than the second pin capacitance. The first signal route and the second signal route may share a main trunk and a first branch but have separate device branches, and the first signal route may have a first device branch that has a first extra resistor in series compared to a second device branch of the second signal route. The first extra resistor may be placed on the first side of the PCB.

In one embodiment, the main trunk may have a first trace impedance, the first branch may have a second trace impedance and the second device branch may have a third trace impedance, the first trace impedance may be lower than the second trace impedance and the second trace impedance may be lower than the third trace impedance.

In one embodiment, data pins of the first non-volatile storage device and the second non-volatile storage device may be coupled to a data bus of the shared channel in a regular order.

In one embodiment, data pins of one of the first non-volatile storage device and the second non-volatile storage device may be coupled to a data bus of the shared channel in a reversed order and the storage controller may be configured to determine that this non-volatile storage device is a mirrored non-volatile storage device and perform read and write operations for this non-volatile storage device accordingly.

In one embodiment, the non-volatile storage system may further comprise a third non-volatile storage device having a third capacity and attached to the first side of the PCB and a fourth non-volatile storage device having a fourth capacity and attached to the second side of the PCB. The third capacity and the fourth capacity may be the same as the second capacity. The third non-volatile storage device and the fourth non-volatile storage device may be placed in a second clamshell configuration. The storage controller may also be coupled to the third non-volatile storage device and the fourth non-volatile storage device by the shared channel. The shared channel may have a third signal route to a third pin of the third non-volatile storage device and a fourth signal route to a fourth pin of the fourth non-volatile storage device. The third pin may have a third pin capacitance and the fourth pin may have a fourth pin capacitance, the third pin capacitance and the fourth pin capacitance may be the same as the second pin capacitance. The third signal route and the fourth signal route may share the main trunk and a second branch but have separate tightly matched device branches. The second branch may be tightly matched with the first branch.

In one embodiment, data pins of the first non-volatile storage device and the second non-volatile storage device may be coupled to a data bus of the shared channel in a regular order.

In one embodiment, data pins of one of the first non-volatile storage device and the second non-volatile storage device may be coupled to a data bus of the shared channel in a reversed order and the storage controller may be configured to determine that this non-volatile storage device is a mirrored non-volatile storage device and perform read and write operations for this non-volatile storage device accordingly.

In one embodiment, the tightly matched device branches of the third signal route and the fourth signal route may be also tightly matched with the second device branch of the second signal route.

In one embodiment, the non-volatile storage system may further comprise a third non-volatile storage device having a third capacity and attached to the first side of the PCB and a fourth non-volatile storage device having a fourth capacity and attached to the second side of the PCB. The third capacity may be the same as the second capacity, the fourth capacity may be the same as the first capacity, the third non-volatile storage device and the fourth non-volatile storage device may be placed in a second clamshell configuration. The storage controller may also be coupled to the third non-volatile storage device and the fourth non-volatile storage device by the shared channel. The shared channel may have a third signal route to a third pin of the third non-volatile storage device and a fourth signal route to a fourth pin of the fourth non-volatile storage device. The third pin may have a third pin capacitance and the fourth pin may have a fourth pin capacitance. The third pin capacitance may be the same as the second pin capacitance. The fourth pin capacitance may be the same as the first pin capacitance. The third signal route and the fourth signal route may share the main trunk and a second branch but have separate device branches. The second branch may be tightly matched with the first branch, and the fourth signal route may have a fourth device branch that has a second extra resistor in series compared to a third device branch of the third signal route. The second extra resistor may be placed on the second side of the PCB.

In one embodiment, data pins of the first non-volatile storage device and the second non-volatile storage device may be coupled to a data bus of the shared channel in a regular order.

In one embodiment, data pins of one of the first non-volatile storage device and the second non-volatile storage device may be coupled to a data bus of the shared channel in a reversed order and the storage controller may be configured to determine that this non-volatile storage device is a mirrored non-volatile storage device and perform read and write operations for this non-volatile storage device accordingly.

In one embodiment, the third device branch of the third signal route may be tightly matched to the second device branch of the second signal route.

In another exemplary embodiment, there is provided another non-volatile storage system that may comprise a printed circuit board (PCB), a first non-volatile storage device having a first capacity and attached to a first side of the PCB, a second non-volatile storage device having a second capacity and attached to a second side of the PCB, a third non-volatile storage device having a third capacity and attached to the first side of the PCB, a fourth non-volatile storage device having a fourth capacity and attached to the second side of the PCB, and a storage controller coupled to the first non-volatile storage device, the second non-volatile storage device, the third non-volatile storage device and the fourth non-volatile storage device by a shared channel. The second capacity may be different from the first capacity. The first non-volatile storage device and the second non-volatile storage device may be placed in a first clamshell configuration. The third capacity and the fourth capacity may be the same as the second capacity. The third non-volatile storage device and the fourth non-volatile storage device may be placed in a second clamshell configuration. The shared channel may have a first signal route to a first pin of the first non-volatile storage device, a second signal route to a second pin of the second non-volatile storage device, a third signal route to a third pin of the third non-volatile storage device and a fourth signal route to a fourth pin of the fourth non-volatile storage device. The first pin may have a first pin capacitance, the second pin may have a second pin capacitance, the third pin may have a third pin capacitance and the fourth pin may have a fourth pin capacitance. The first pin capacitance may be smaller than the second pin capacitance, the third pin capacitance and the fourth pin capacitance may be the same as the second pin capacitance. The first signal route and the second signal route may share a main trunk and a first branch but have separate device branches. The first signal route may have a first device branch that has a first extra resistor in series compared to a second device branch of the second signal route, the first extra resistor may be placed on the first side of the PCB. The third signal route and the fourth signal route may share the main trunk and a second branch but have separate tightly matched device branches. The second branch may be tightly matched to the first branch.

In one embodiment, the main trunk may have a first trace impedance, the first branch and the second branch may have a second trace impedance, the second device branch and the separate tightly matched device branches may have a third trace impedance, the first trace impedance may be lower than the second trace impedance and the second trace impedance may be lower than the third trace impedance.

In one embodiment, data pins of the first non-volatile storage device and the second non-volatile storage device may be coupled to a data bus of the shared channel in a regular order.

In one embodiment, data pins of one of the first non-volatile storage device and the second non-volatile storage device may be coupled to a data bus of the shared channel in a reversed order and the storage controller may be configured to determine that this non-volatile storage device is a mirrored non-volatile storage device and perform read and write operations for this non-volatile storage device accordingly.

In yet another exemplary embodiment, there is provided yet another non-volatile storage system that may comprise a printed circuit board (PCB), a first non-volatile storage device having a first capacity and attached to a first side of the PCB, a second non-volatile storage device having a second capacity and attached to a second side of the PCB, a third non-volatile storage device having a third capacity and attached to the first side of the PCB, a fourth non-volatile storage device having a fourth capacity and attached to the second side of the PCB, and a storage controller coupled to the first non-volatile storage device, the second non-volatile storage device, the third non-volatile storage device and the fourth non-volatile storage device by a shared channel. The second capacity may be different from the first capacity the third capacity may be the same as the second capacity, the fourth capacity may be the same as the first capacity. The first non-volatile storage device and the second non-volatile storage device may be placed in a first clamshell configuration; the third non-volatile storage device and the fourth non-volatile storage device may be placed in a second clamshell configuration. The shared channel may have a first signal route to a first pin of the first non-volatile storage device, a second signal route to a second pin of the second non-volatile storage device, a third signal route to a third pin of the third non-volatile storage device and a fourth signal route to a fourth pin of the fourth non-volatile storage device. The first pin may have a first pin capacitance, the second pin may have a second pin capacitance, the third pin may have a third pin capacitance and the fourth pin may have a fourth pin capacitance. The first pin capacitance may be smaller than the second pin capacitance, the third pin capacitance may be the same as the second pin capacitance, the fourth pin capacitance may be the same as the first pin capacitance. The first signal route and the second signal route may share a main trunk and a first branch but have separate device branches, and the first signal route may have a first device branch that has a first extra resistor in series compared to a second device branch of the second signal route. The first extra resistor may be placed on the first side of the PCB. The third signal route and the fourth signal route may share the main trunk and a second branch but have separate device branches. The second branch may be tightly matched with the first branch, and the fourth signal route may have a fourth device branch that has a second extra resistor in series compared to a third device branch of the third signal route. The second extra resistor may be placed on the second side of the PCB.

In one embodiment, the main trunk may have a first trace impedance, the first branch and the second branch may have a second trace impedance, the second device branch and the third device branch may have a third trace impedance, the first trace impedance may be lower than the second trace impedance and the second trace impedance may be lower than the third trace impedance.

In one embodiment, data pins of the first non-volatile storage device and the second non-volatile storage device may be coupled to a data bus of the shared channel in a regular order.

In one embodiment, data pins of one of the first non-volatile storage device and the second non-volatile storage device may be coupled to a data bus of the shared channel in a reversed order and the storage controller may be configured to determine that this non-volatile storage device is a mirrored non-volatile storage device and perform read and write operations for this non-volatile storage device accordingly.

Any of the disclosed methods and operations may be implemented as computer-executable instructions (e.g., software code for the operations described herein) stored on one or more computer-readable storage media (e.g., non-transitory computer-readable media, such as one or more optical media discs, volatile memory components (such as DRAM or SRAM), or nonvolatile memory components (such as hard drives)) and executed on a device controller (e.g., firmware executed by ASIC). Any of the computer-executable instructions for implementing the disclosed techniques as well as any data created and used during implementation of the disclosed embodiments can be stored on one or more computer-readable media (e.g., non-transitory computer-readable media).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A non-volatile storage system, comprising:
   a printed circuit board (PCB);
   a first non-volatile storage device having a first capacity and attached to a first side of the PCB;
   a second non-volatile storage device having a second capacity and attached to a second side of the PCB, the second capacity being different from the first capacity, the first non-volatile storage device and the second non-volatile storage device being placed in a first clamshell configuration; and
   a storage controller coupled to the first non-volatile storage device and the second non-volatile storage device by a shared channel, the shared channel having a first signal route to a first pin of the first non-volatile storage device and a second signal route to a second pin of the second non-volatile storage device, the first pin having a first pin capacitance and the second pin having a second pin capacitance, the first pin capacitance being smaller than the second pin capacitance, wherein the first signal route and the second signal route share a main trunk and a first branch but have separate device branches, and the first signal route has a first device branch that has a first extra resistor in series compared to a second device branch of the second signal route, the first extra resistor is placed on the first side of the PCB.

2. The non-volatile storage system of claim 1, wherein the main trunk has a first trace impedance, the first branch has a second trace impedance and the second device branch has a third trace impedance, the first trace impedance is lower than the second trace impedance and the second trace impedance is lower than the third trace impedance.

3. The non-volatile storage system of claim 1, wherein data pins of the first non- volatile storage device and the second non-volatile storage device are coupled to a data bus of the shared channel in a regular order.

4. The non-volatile storage system of claim 1, wherein data pins of one of the first non-volatile storage device and the second non-volatile storage device are coupled to a data bus of the shared channel in a reversed order and the storage controller is configured to determine that this non-volatile storage device is a mirrored non-volatile storage device and perform read and write operations for this non-volatile storage device accordingly.

5. The non-volatile storage system of claim 2, further comprising:
   a third non-volatile storage device having a third capacity and attached to the first side of the PCB; and
   a fourth non-volatile storage device having a fourth capacity and attached to the second side of the PCB, the third capacity and the fourth capacity being the same as the second capacity, the third non-volatile storage device and the fourth non-volatile storage device being placed in a second clamshell configuration,
   wherein the storage controller is also coupled to the third non-volatile storage device and the fourth non-volatile storage device by the shared channel, the shared channel has a third signal route to a third pin of the third non-volatile storage device and a fourth signal route to a fourth pin of the fourth non-volatile storage device, the third pin has a third pin capacitance and the fourth pin has a fourth pin capacitance, the third pin capacitance and the fourth pin capacitance are the same as the second pin capacitance,
   wherein the third signal route and the fourth signal route share the main trunk and a second branch but have separate tightly matched device branches, the second branch is tightly matched with the first branch.

6. The non-volatile storage system of claim 5, wherein data pins of the first non-volatile storage device and the second non-volatile storage device are coupled to a data bus of the shared channel in a regular order.

7. The non-volatile storage system of claim 5, wherein data pins of one of the first non-volatile storage device and the second non-volatile storage device are coupled to a data bus of the shared channel in a reversed order and the storage controller is configured to determine that this non-volatile storage device is a mirrored non-volatile storage device and perform read and write operations for this non-volatile storage device accordingly.

8. The non-volatile storage system of claim 5, wherein the tightly matched device branches of the third signal route and the fourth signal route are also tightly matched with the second device branch of the second signal route.

9. The non-volatile storage system of claim 2, further comprising:
a third non-volatile storage device having a third capacity and attached to the first side of the PCB; and
a fourth non-volatile storage device having a fourth capacity and attached to the second side of the PCB, the third capacity being the same as the second capacity, the fourth capacity being the same as the first capacity, the third non-volatile storage device and the fourth non-volatile storage device being placed in a second clamshell configuration,
wherein the storage controller is also coupled to the third non-volatile storage device and the fourth non-volatile storage device by the shared channel, the shared channel has a third signal route to a third pin of the third non-volatile storage device and a fourth signal route to a fourth pin of the fourth non-volatile storage device, the third pin has a third pin capacitance and the fourth pin has a fourth pin capacitance, the third pin capacitance is the same as the second pin capacitance, the fourth pin capacitance is the same as the first pin capacitance,
wherein the third signal route and the fourth signal route share the main trunk and a second branch but have separate device branches, the second branch is tightly matched with the first branch, and the fourth signal route has a fourth device branch that has a second extra resistor in series compared to a third device branch of the third signal route, the second extra resistor is placed on the second side of the PCB.

10. The non-volatile storage system of claim 9, wherein data pins of the first non-volatile storage device and the second non-volatile storage device are coupled to a data bus of the shared channel in a regular order.

11. The non-volatile storage system of claim 9, wherein data pins of one of the first non-volatile storage device and the second non-volatile storage device are coupled to a data bus of the shared channel in a reversed order and the storage controller is configured to determine that this non-volatile storage device is a mirrored non-volatile storage device and perform read and write operations for this non-volatile storage device accordingly.

12. The non-volatile storage system of claim 9, wherein the third device branch of the third signal route is tightly matched to the second device branch of the second signal route.

13. A non-volatile storage system, comprising:
a printed circuit board (PCB);
a first non-volatile storage device having a first capacity and attached to a first side of the PCB;
a second non-volatile storage device having a second capacity and attached to a second side of the PCB, the second capacity being different from the first capacity, the first non-volatile storage device and the second non-volatile storage device being placed in a first clamshell configuration;
a third non-volatile storage device having a third capacity and attached to the first side of the PCB;
a fourth non-volatile storage device having a fourth capacity and attached to the second side of the PCB, the third capacity and the fourth capacity being the same as the second capacity, the third non-volatile storage device and the fourth non-volatile storage device being placed in a second clamshell configuration; and
a storage controller coupled to the first non-volatile storage device, the second non-volatile storage device, the third non-volatile storage device and the fourth non-volatile storage device by a shared channel, the shared channel having a first signal route to a first pin of the first non-volatile storage device, a second signal route to a second pin of the second non-volatile storage device, a third signal route to a third pin of the third non-volatile storage device and a fourth signal route to a fourth pin of the fourth non-volatile storage device, the first pin having a first pin capacitance, the second pin having a second pin capacitance, the third pin has a third pin capacitance and the fourth pin has a fourth pin capacitance, the first pin capacitance being smaller than the second pin capacitance, the third pin capacitance and the fourth pin capacitance being the same as the second pin capacitance,
wherein the first signal route and the second signal route share a main trunk and a first branch but have separate device branches, and the first signal route has a first device branch that has a first extra resistor in series compared to a second device branch of the second signal route, the first extra resistor is placed on the first side of the PCB,
wherein the third signal route and the fourth signal route share the main trunk and a second branch but have separate tightly matched device branches, the second branch is tightly matched to the first branch.

14. The non-volatile storage system of claim 13, wherein the main trunk has a first trace impedance, the first branch and the second branch have a second trace impedance, the second device branch and the separate tightly matched device branches have a third trace impedance, the first trace impedance is lower than the second trace impedance and the second trace impedance is lower than the third trace impedance.

15. The non-volatile storage system of claim 13, wherein data pins of the first non-volatile storage device and the second non-volatile storage device are coupled to a data bus of the shared channel in a regular order.

16. The non-volatile storage system of claim 13, wherein data pins of one of the first non-volatile storage device and the second non-volatile storage device are coupled to a data bus of the shared channel in a reversed order and the storage controller is configured to determine that this non-volatile storage device is a mirrored non-volatile storage device and perform read and write operations for this non-volatile storage device accordingly.

17. A non-volatile storage system, comprising:
a printed circuit board (PCB);
a first non-volatile storage device having a first capacity and attached to a first side of the PCB;
a second non-volatile storage device having a second capacity and attached to a second side of the PCB, the second capacity being different from the first capacity, the first non-volatile storage device and the second non-volatile storage device being placed in a first clamshell configuration;
a third non-volatile storage device having a third capacity and attached to the first side of the PCB;
a fourth non-volatile storage device having a fourth capacity and attached to the second side of the PCB, the third capacity being the same as the second capacity, the fourth capacity being the same as the first capacity, the third non-volatile storage device and the fourth non-volatile storage device being placed in a second clamshell configuration, and a storage controller coupled to the first non-volatile storage device, the second non-volatile storage device, the third non-volatile storage device and the fourth non-volatile storage device by a shared channel, the shared channel having a first signal route to a first pin of the first non-volatile storage device, a second signal route to a second pin of the second non-volatile storage device, a third signal route to a third pin of the third non-volatile storage device and a fourth signal route to a fourth pin of the fourth non-volatile storage device, the first pin having a first pin capacitance, the second pin having a second pin capacitance, the third pin has a third pin capacitance and the fourth pin has a fourth pin capacitance, the first pin capacitance being smaller than the second pin capacitance, the third pin capacitance being the same as the second pin capacitance, the fourth pin capacitance being the same as the first pin capacitance, wherein the first signal route and the second signal route share a main trunk and a first branch but have separate device branches, and the first signal route has a first device branch that has a first extra resistor in series compared to a second device branch of the second signal route, the first extra resistor is placed on the first side of the PCB, wherein the third signal route and the fourth signal route share the main trunk and a second branch but have separate device branches, the second branch is tightly matched with the first branch, and the fourth signal route has a fourth device branch that has a second extra resistor in series compared to a third device branch of the third signal route, the second extra resistor is placed on the second side of the PCB.

18. The non-volatile storage system of claim 17, wherein the main trunk has a first trace impedance, the first branch and the second branch have a second trace impedance, the second device branch and the third device branch have a third trace impedance, the first trace impedance is lower than the second trace impedance and the second trace impedance is lower than the third trace impedance.

19. The non-volatile storage system of claim 17, wherein data pins of the first non-volatile storage device and the second non-volatile storage device are coupled to a data bus of the shared channel in a regular order.

20. The non-volatile storage system of claim 17, wherein data pins of one of the first non-volatile storage device and the second non-volatile storage device are coupled to a data bus of the shared channel in a reversed order and the storage controller is configured to determine that this non-volatile storage device is a mirrored non-volatile storage device and perform read and write operations for this non-volatile storage device accordingly.

* * * * *